(12) United States Patent
Uchida et al.

(10) Patent No.: US 11,378,812 B2
(45) Date of Patent: Jul. 5, 2022

(54) DIFFUSER PLATE AND METHOD FOR DESIGNING DIFFUSER PLATE

(71) Applicant: KURARAY CO., LTD., Kurashiki (JP)

(72) Inventors: Atsushi Uchida, Kamisu (JP); Masaru Karai, Kamisu (JP)

(73) Assignee: KURARAY CO., LTD., Kurashiki (JP)

( * ) Notice: Subject to any disclaimer, the term of this patent is extended or adjusted under 35 U.S.C. 154(b) by 225 days.

(21) Appl. No.: 16/713,501

(22) Filed: Dec. 13, 2019

(65) Prior Publication Data

US 2020/0117019 A1    Apr. 16, 2020

Related U.S. Application Data

(63) Continuation of application No. 15/515,426, filed as application No. PCT/JP2015/004961 on Sep. 30, 2015, now Pat. No. 10,551,633.

(30) Foreign Application Priority Data

Sep. 30, 2014  (JP) ................. 2014-201606

(51) Int. Cl.
  *G02B 27/48*  (2006.01)
  *G02B 3/00*  (2006.01)
  (Continued)

(52) U.S. Cl.
  CPC .......... *G02B 27/48* (2013.01); *G02B 3/0043* (2013.01); *G02B 5/0221* (2013.01);
  (Continued)

(58) Field of Classification Search
  CPC .... G02B 27/48; G02B 3/0043; G02B 5/0221; G02B 5/0278; G02B 5/0284; G02B 27/0012; G02B 21/325; G02B 21/602
  See application file for complete search history.

(56) References Cited

U.S. PATENT DOCUMENTS 6,661,581 B1    12/2003 Sankur
2002/0034710 A1   3/2002 Morris et al.
(Continued)

FOREIGN PATENT DOCUMENTS

CN    1386203 A    12/2002
EP    2 120 070 A1  11/2009
(Continued)

OTHER PUBLICATIONS

International Search Report dated Dec. 8, 2015 in PCT/JP2015/004961 filed Sep. 30, 2015.
(Continued)

*Primary Examiner* — Christopher Stanford
*Assistant Examiner* — Journey F Sumlar
(74) *Attorney, Agent, or Firm* — Oblon, McClelland, Maier & Neustadt, L.L.P.

(57) ABSTRACT

The present invention provides a diffuser plate in a simple structure capable of achieving optical properties with less luminance irregularity and color irregularity and good quality of appearance. A diffuser plate is a diffuser plate where a plurality of microlenses are placed on a principal surface, shapes of the plurality of microlenses along a cross-section perpendicular to the principal surface are different from one another and do not have an axis of symmetry. A method for designing the diffuser plate includes steps of determining a specific reference microlens; placing the reference microlens on the principal surface; forming a specific phase modulation shape; and determining a shape of the plurality of microlenses by combining the specific reference microlens and the specific phase modulation shape.

16 Claims, 11 Drawing Sheets

(51) Int. Cl.
*G02B 5/02* (2006.01)
*G02B 27/00* (2006.01)
*G03B 21/602* (2014.01)
*G03B 21/625* (2014.01)

(52) U.S. Cl.
CPC ......... *G02B 5/0278* (2013.01); *G02B 5/0284* (2013.01); *G02B 27/0012* (2013.01); *G03B 21/602* (2013.01); *G03B 21/625* (2013.01)

(56) References Cited

U.S. PATENT DOCUMENTS

| | | | |
|---|---|---|---|
| 2003/0025856 A1* | 2/2003 | Takahashi | G02B 5/0236 349/87 |
| 2003/0039035 A1 | 2/2003 | Yoshikawa et al. | |
| 2007/0103747 A1 | 5/2007 | Powell et al. | |
| 2007/0229804 A1* | 10/2007 | Inoue | G02B 5/0242 356/213 |
| 2008/0192353 A1* | 8/2008 | Nagahama | G02B 5/0221 359/599 |
| 2010/0232023 A1* | 9/2010 | Nagahama | G02B 5/0268 359/599 |
| 2012/0051044 A1 | 3/2012 | Akiyama | |

FOREIGN PATENT DOCUMENTS

| | | |
|---|---|---|
| JP | 2000-48613 A | 2/2000 |
| JP | 2004-505306 A | 2/2004 |
| JP | 2004-510194 A | 4/2004 |
| JP | 2007-011213 | 1/2007 |
| JP | 2007-25441 A | 2/2007 |
| JP | 2007-523369 A | 3/2007 |
| JP | 2010-145745 A | 7/2010 |
| JP | 2012-47996 A | 3/2012 |
| JP | 2012-226300 A | 11/2012 |
| KR | 10-2002-0057964 | 7/2002 |
| WO | WO 2014/104106 A1 | 7/2014 |

OTHER PUBLICATIONS

Hakan Urey et al., "Microlens-array-based exit-pupil expander for full-color displays", Applied Optics, vol. 44, No. 23, Aug. 10, 2005, pp. 4930-4936.
Office Action dated Sep. 13, 2018, in Taiwan Patent Application No. 104132110.
Frank Wippermann et al., "Beam homogenizers based on chirped microlens arrays", issued on May 14, 2007, vol. 15, No. 10, Optics Express, pp. 6218-6231.
Tung-Yu Chang et al., "Asymmetric focusing microlens array fabricated using off-axis lithography", Microsyst Technol (2013), pp. 861-869.
Combined Chinese Office Action and Search Report dated Jul. 4, 2018 in corresponding Patent Application No. 201580052717.3 (with English Translation), 13 pages.
Extended European Search Report dated May 23, 2018 in European Patent Application No. 15847280.3, 6 pages.

* cited by examiner

PRESENT INVENTION

Fig. 9A

RELATED ART

DIFFUSER PLATE AND METHOD FOR DESIGNING DIFFUSER PLATE

CROSS REFERENCE TO RELATED APPLICATIONS

The present application continuation of U.S. patent application Ser. No. 15/515,426, filed on Mar. 29, 2017, which is a 35 U.S.C. § 371 national stage patent application of international patent application PCT/JP2015/004961, filed on Sep. 30, 2015, which claims priority to Japanese patent application JP 2014-201606, filed on Sep. 30, 2014.

TECHNICAL FIELD

The present invention relates to a diffuser plate and a method for designing a diffuser plate.

BACKGROUND ART

A diffuser plate using a microlens array is used as screens such as a head-up display and a laser projector. Using a microlens array is advantageous in that it is possible to suppress speckle noise of laser light compared with using a diffuser plate such as a translucent plate or a frosted glass.

Patent Literature 1 discloses an image forming device including a diffuser plate using a laser projector that has laser light as a light source and projects a video which is an array of a plurality of pixels and a microlens array in which a plurality of microlenses are placed in an array. Using a microlens array makes it possible to appropriately diffuse incident light and flexibly design a necessary angle of diffusion.

Patent Literatures 2 and 3 and Non Patent Literature 1 disclose a screen using two microlens arrays. In the case of using a single microlens array, luminance irregularity and color irregularity are likely to occur. Patent Literatures 2 and 3 and Non Patent Literature 1 describe that, with use of two microlens arrays, it is possible to suppress the occurrence of luminance irregularity.

Further, Patent Literature 3 discloses that, by using one microlens array where microlenses having different properties are placed, it is possible to suppress the occurrence of luminance irregularity due to diffracted light and interfering light caused by the periodic structure.

Patent Literature 4 discloses a method for improving luminance irregularity and color irregularity that occur due to diffraction spots caused by the periodicity of a microstructure by placing a piston form (raised part) having a vertical side surface on a microlens and by randomly distributing at least one of parameters that define the shape or position of a microstructure according to a predetermined probability density function.

CITATION LIST

Patent Literature

PTL1: Japanese Unexamined Patent Application Publication No. 2010-145745
PTL2: Japanese Unexamined Patent Application Publication No. 2012-226300
PTL3: Japanese Unexamined Patent Application Publication (Translation of PCT Application) No. 2007-523369
PTL4: Japanese Unexamined Patent Application Publication (Translation of PCT Application) No. 2004-505306

Non Patent Literature

NPL1: H. Urey and K. D. Powell, "Microlens-array-based exit-pupil expander for full-color displays", APPLIED OPTICS Vol. 44, No. 23, p. 4930-4936

SUMMARY OF INVENTION

Technical Problem

Patent Literature 3 does not disclose the specific shape and placement of the microlenses for suppressing the occurrence of luminance irregularity. Further, if a random distribution is added simultaneously to a plurality of parameters such as the curvature and placement of microlenses to make uniform color irregularity and luminance irregularity, for example, speckle due to laser light is likely to occur when the diffuser plate is used as a screen, which raises a problem of degradation in image quality.

In Patent Literature 4, a plurality of microlenses are raised by use of piston forms having different heights from the principal surface of a substrate so as to add different phase differences to the plurality of microlenses, thereby suppressing the occurrence of diffracted light and interfering light and obtaining uniform diffusion properties as a whole diffuser plate. However, because the piston form stands vertically on the principal surface of the substrate, moldability is not good, and molding defects such as sticking of parts in the mold is likely to occur during production. Light is scattered in a defective part on the diffuser plate, which can result in poor appearance of an image when projected.

The present invention has been accomplished to solve the above problems and an object of the present invention is thus to provide a diffuser plate and a method for designing a diffuser plate in a simple structure capable of achieving optical properties with less luminance irregularity and color irregularity and good quality of appearance when an image is projected.

Solution to Problem

A diffuser plate according to the present invention is a diffuser plate where a plurality of microlenses are placed on a principal surface, wherein shapes of the plurality of microlenses along a cross-section perpendicular to the principal surface are different from one another and do not have an axis of symmetry.

In the present invention, a surface shape of each of the plurality of microlenses along the cross-section consists only of curves.

In the present invention, apexes of the plurality of microlenses are at different positions in a direction perpendicular to the principal surface.

In the present invention, the plurality of microlenses are arranged in a lattice pattern on the principal surface.

In the present invention, the diffuser plate is a transmissive diffuser plate, the plurality of microlenses are convex lenses, and $0.2 \leq \Delta H \times (n-1) \times 1000/\lambda$ is satisfied where $\Delta H [\mu m]$ is a difference between a maximum height and a minimum height of an apex of a convex surface of the plurality of microlenses from the principal surface, n is a refractive index of the microlens, and $\lambda [nm]$ is a wavelength of incidence light.

In the present invention, the diffuser plate is a transmissive diffuser plate, the plurality of microlenses are concave lenses, and $0.2 \leq \Delta D \times (n-1) \times 1000/\lambda$ is satisfied where $\Delta D [\mu m]$ is a difference between a maximum depth and a minimum depth of an apex of a concave surface of the plurality of microlenses from the principal surface, n is a refractive index of the microlens, and λ[nm] is a wavelength of incidence light.

In the present invention, the diffuser plate is a reflective diffuser plate, the plurality of microlenses are convex lenses, and 0.1≤ΔH×1000/λ, is satisfied where ΔH[μm] is a difference between a maximum height and a minimum height of an apex of a convex surface of the plurality of microlenses from the principal surface, and λ[nm] is a wavelength of incidence light.

In the present invention, the diffuser plate is a reflective diffuser plate, the plurality of microlenses are concave lenses, and 0.1≤ΔD×1000/λ is satisfied where ΔD[μm] is a difference between a maximum depth and a minimum depth of an apex of a concave surface of the plurality of microlenses from the principal surface, and λ[nm] is a wavelength of incidence light.

In the present invention, a shape of the plurality of microlenses is a composite shape of one reference microlens repetitively placed on the principal surface and a phase modulation shape having a curve continuously varying with respect to the principal surface.

In the present invention, an optical axis of a microlens array composed of the plurality of microlenses is in a direction perpendicular to the principal surface.

A method for designing a diffuser plate according to the present invention is a method for designing a diffuser plate where a plurality of microlenses are placed on a principal surface, the method including determining one or a plurality of shapes of reference microlenses where a cross-section perpendicular to the principal surface has an axis of symmetry, placing the plurality of reference microlenses on the principal surface; forming a phase modulation shape having a curve continuously varying with respect to the principal surface; and determining a shape of the plurality of microlenses by combining a shape of the plurality of placed reference microlenses and the phase modulation shape.

In the present invention, a plurality of raised parts to be disposed between the plurality of placed reference microlenses and the principal surface are formed, and the phase modulation shape is formed by averaging heights of the plurality of formed raised parts.

In the present invention, the phase modulation shape along the cross-section is a moving-average approximate curve of heights of the plurality of formed raised parts.

In the present invention, the plurality of microlenses are arranged in a lattice pattern on the principal surface.

Advantageous Effects of Invention

According to the present invention, it is possible to provide a diffuser plate and a method for designing a diffuser plate in a simple structure capable of achieving optical properties with less luminance irregularity and color irregularity and good quality of appearance when an image is projected.

DESCRIPTION OF EMBODIMENTS

First Embodiment

Embodiments of the present invention are described hereinafter with reference to the drawings.
(Shape of Diffuser Plate)

Figure 1:
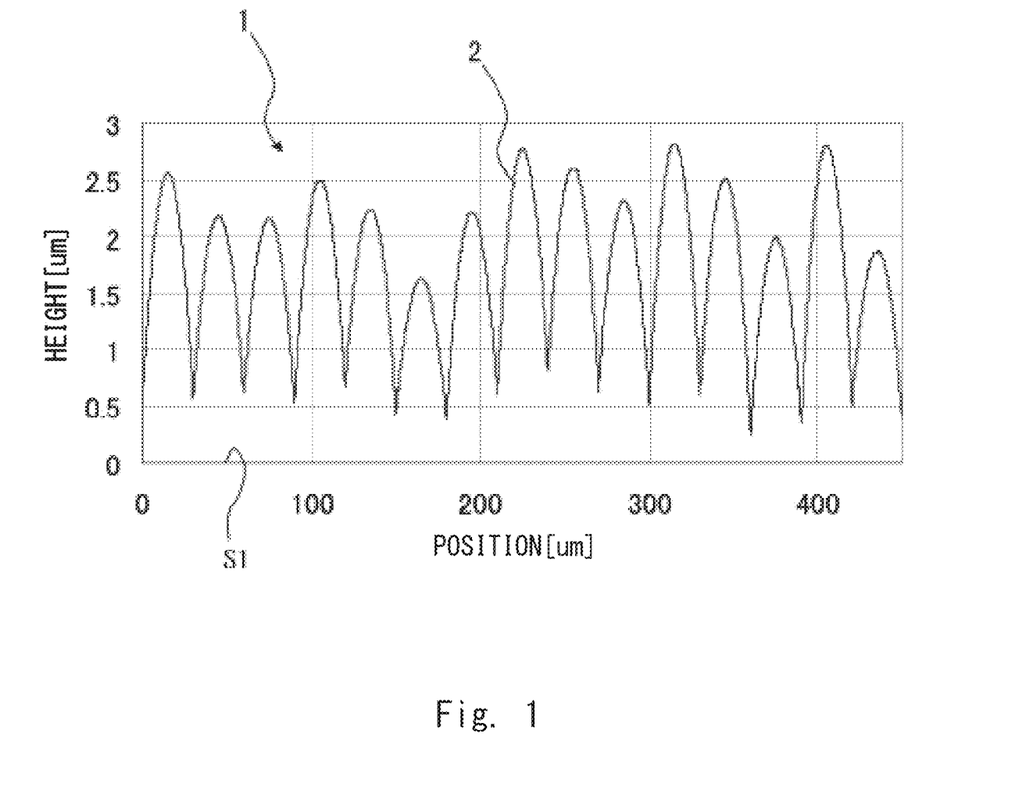
FIG. 1 is a view showing the cross-sectional profile of a cross-section perpendicular to the principal surface of a diffuser plate according to a first embodiment.

FIG. 1 is a view showing the cross-sectional profile of a cross-section perpendicular to a principal surface S1 of a diffuser plate 1 according to this embodiment. As shown in FIG. 1, the diffuser plate 1 is an optical diffuser plate in which a plurality of microlenses 2 are placed on the principal surface S1 of a substrate. The plurality of microlenses 2 are arranged in a lattice pattern on the principal surface S1. The vertical axis in FIG. 1 indicates the height of a lens shape from the principal surface S1 where the height of the principal surface S1 of the substrate is 0. The horizontal axis in FIG. 1 indicates the position in a direction parallel to the principal surface S1. Note that the optical axis of a microlens array composed of the plurality of microlenses 2 is in the direction perpendicular to the principal surface S1.

As shown in FIG. 1, the shapes of the plurality of microlenses 2 along the cross-section perpendicular to the principal surface S1 are different from one another and do not have the axis of symmetry. The surface shape of each of the plurality of microlenses 2 along the cross-section consists only of curves. The apexes of the plurality of microlenses 2 are at different positions in the direction perpendicular to the principal surface S1.

Figure 2:
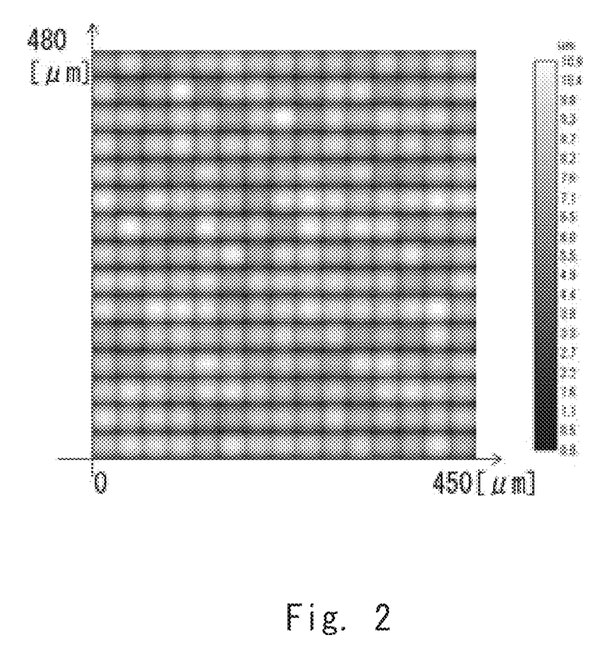
FIG. 2 is a view showing a shape on the principal surface of the diffuser plate according to the first embodiment.

FIG. 2 shows a microlens array in a unit area of about 450 μm×480 μm. The diffuser plate 1 is formed by placing the unit areas all over the principal surface S1 of the substrate. The vertical axis and the horizontal axis in FIG. 2 indicate the coordinates on the principal surface S1, and the height of each microlens from the principal surface S1 is shown by a difference in color. In FIG. 2, as the color is closer to black, the height from the principal surface S is smaller, and as the color is closer to white, the height from the principal surface S1 is larger. It is preferred that the plurality of microlenses 2 are arranged in a lattice pattern on the principal surface S1 as shown in FIG. 2. Although the plurality of microlenses 2 are arranged in a rectangular lattice pattern in FIG. 2, the lattice pattern is not limited to rectangular lattice, and it may be square lattice, equilateral triangle lattice, orthorhombic lattice, parallelotope lattice and the like.

Figure 3:
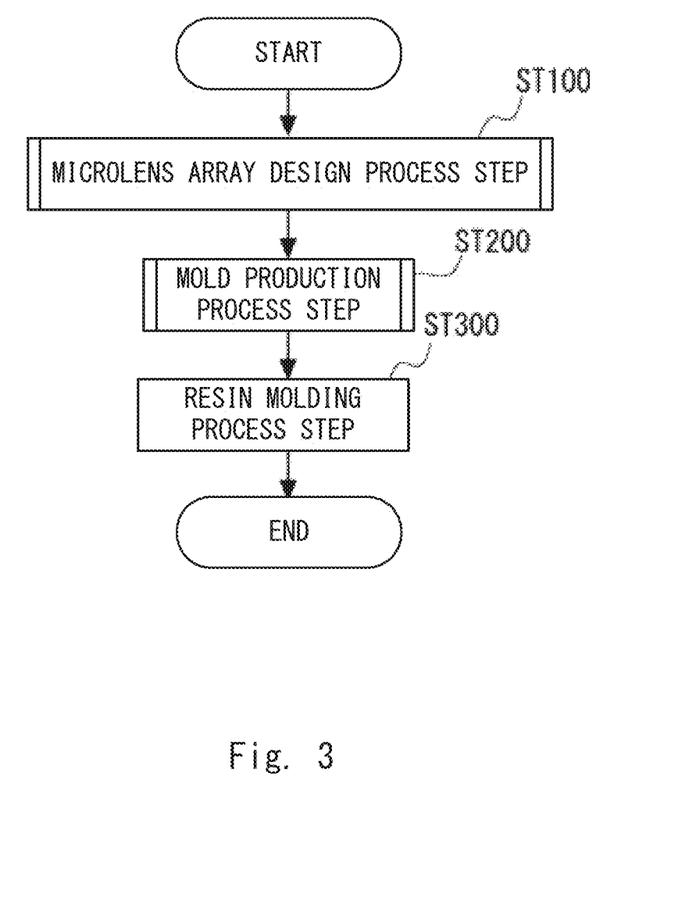
FIG. 3 is a flowchart showing a process of a method for producing the diffuser plate according to the first embodiment.

FIG. 3 is a flowchart showing a process of a method for producing the diffuser plate 1. A method for producing the diffuser plate 1 according to this embodiment includes a process step of designing a microlens array that presents desired light diffusion properties (ST100), a process step of producing a mold for the microlens array (ST200), and a process step of transferring the shape of the microlens array to resin by using the mold (ST300).

The process steps are sequentially described below.
(Microlens Array Design Process Step)

Figure 4:
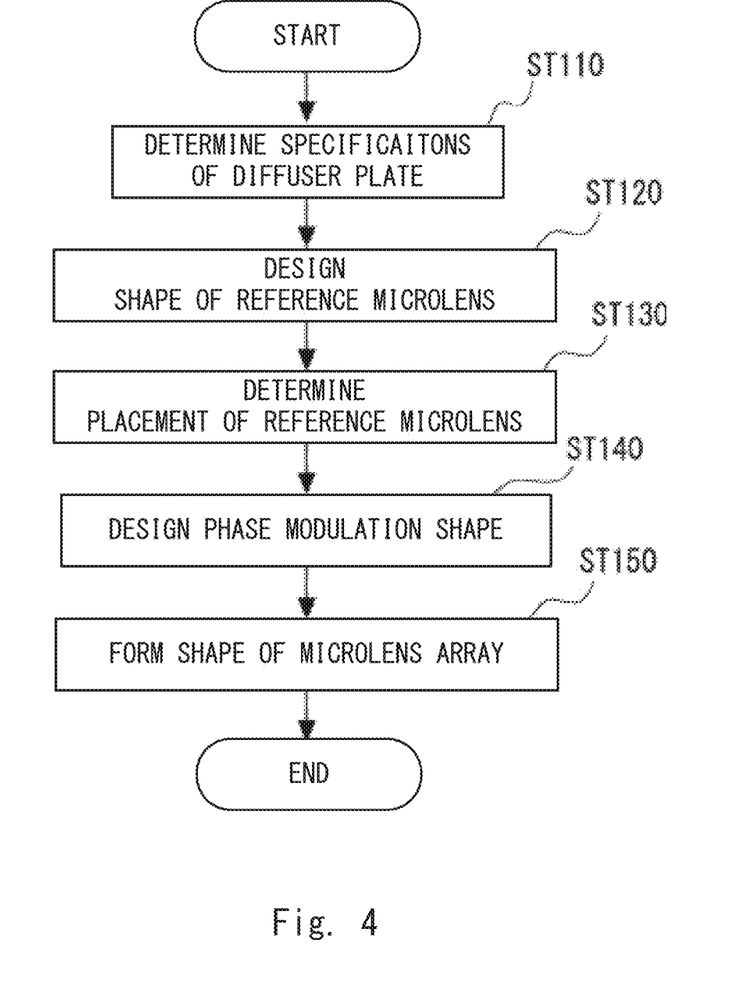
FIG. 4 is a flowchart showing a design process of a microlens array according to the first embodiment.

A microlens array design process step (ST100) in the design of the diffuser plate 1 according to this embodiment is described hereinafter with reference to FIG. 4. In this embodiment, a shape of a reference microlens 3 (FIG. 5) and a phase modulation shape 4 that adds a phase difference to the reference microlens 3 (FIG. 6) are designed separately.

First, the specification of optical physical properties (particularly, refractive index) of materials to be used for the diffuser plate 1, a use wavelength and necessary diffusion properties are determined (ST110).

Figure 5:
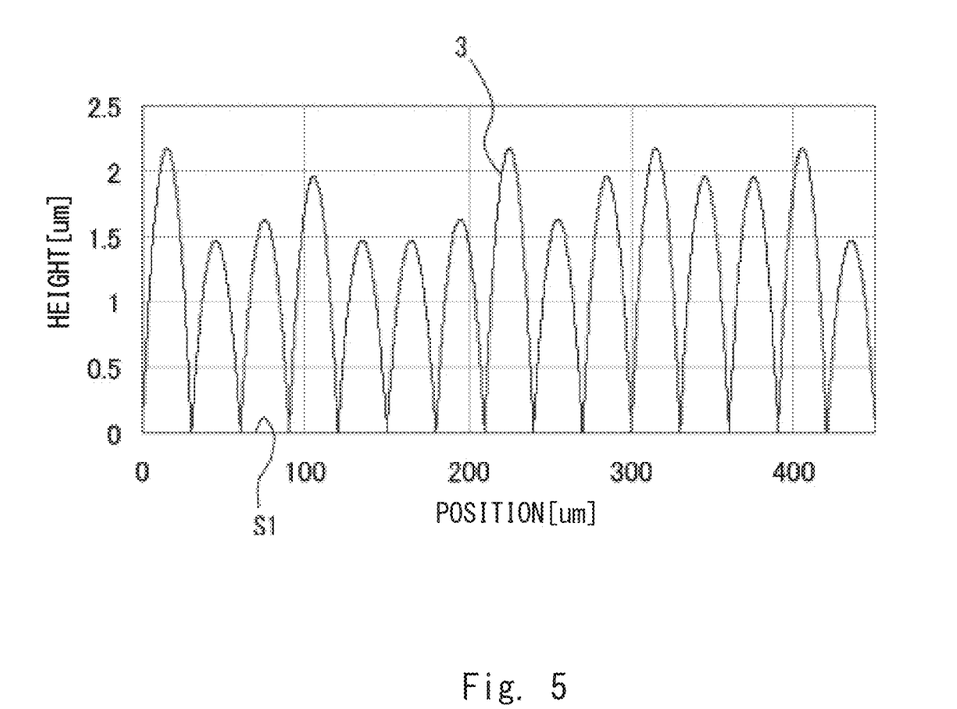
FIG. 5 is a view showing the cross-sectional profile of a plurality of reference microlenses according to the first embodiment.

Next, the shape of the reference microlens 3 is designed (ST120). The shape of the reference microlens 3 may be any shape such as spherical and aspherical as long as it satisfies the specification of diffusion properties required. Although the number of types of the reference microlens 3 to be used for design of the diffuser plate 1 is not limited, it is preferred to use a smaller number of types within the range of satisfying the necessary characteristics. FIG. shows, as an example of the shape of the reference microlens 3, the cross-sectional profile of a microlens array in which spherical lenses having four types of curvature are placed.

Because it is desirable that the plurality of microlenses 2 are closely packed in the diffuser plate 1, the undersurface of the reference microlens 3 preferably has a shape that is suitable for close packing, such as square, rectangle or regular hexagon. Note that, however, this does not apply in the case of adding anisotropy to the optical properties of the diffuser plate 1, for example, and the shape and the aspect ratio of the undersurface of the reference microlens 3 may be set arbitrarily.

After that, the placement of the reference microlenses 3 is determined (ST130). To be specific, the placement pattern and the pitch of the reference microlenses 3 in a unit area on the principal surface S1 are determined. As shown in FIG. 5, a plurality of microlenses in different shapes may be used. Further, as shown in FIG. 2, the reference microlenses 3 are preferably arranged in a lattice pattern on the principal surface S1.

By periodically repeating the unit area, a necessary pattern area can be filled. By increasing the size of a unit area and randomly placing a plurality of types of unit areas, it is possible to effectively reduce luminance irregularity and color irregularity. Further, by repeating such a unit area, the amount of data required for processing can be suppressed, and it is thereby possible to reduce the load of data creation. As a matter of course, data for the whole area of the microlens array may be prepared in block if a processing machine can process a large amount of data with no problem.

Then, the phase modulation shape 4 for adding a phase difference is designed (ST140). In the diffuser plate 1 according to this embodiment, a phase difference is represented by normalizing a difference in the optical path length of light transmitted or reflected by the microlens 2 by wavelength. In order to add a phase difference to each of the plurality of microlenses 2, the phase modulation shape 4 is defined separately from the shape of the reference microlens 3. The phase modulation shape 4 may be generated based on the average pitch, a difference in height and the like, for example, and it may be generated by combining several sinusoidal waves.

Figure 6:
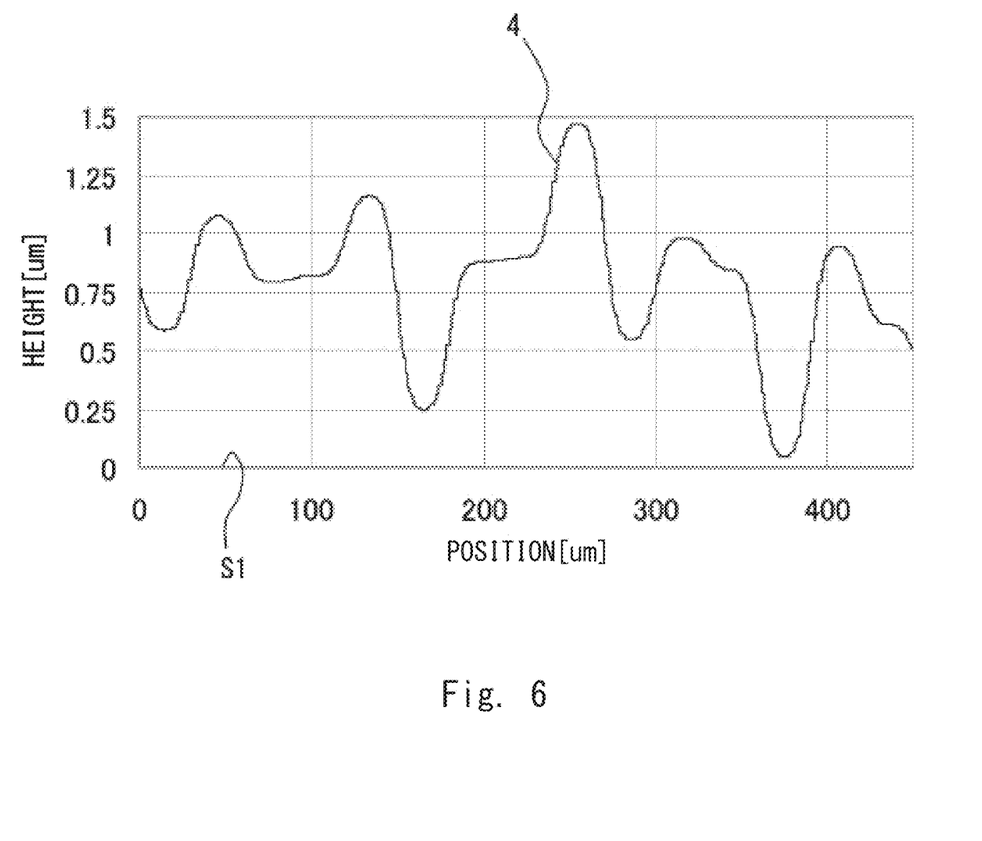
FIG. 6 is a view showing the cross-sectional profile of a phase modulation shape according to the first embodiment.

In this embodiment, a phase difference is randomly set by using uniform random numbers for the plurality of microlenses 2 within a predetermined phase difference range. First, a phase difference that is represented by one numerical value is set for each of the plurality of microlenses 2. In this state, a phase difference is not continuous at the boundary of the microlenses 2. Therefore, by averaging the phase differences of the plurality of microlenses 2 that constitute the microlens array, the phase modulation shape 4 with a three-dimensional curve where the phase difference varies continuously is formed. FIG. 6 shows an example of the shape of the phase modulation shape 4.

After that, the shape of the plurality of microlenses 2 is formed (ST150). The shape of the plurality of microlenses 2 in the microlens array to be finally formed is a composite shape of the phase modulation shape 4 and the plurality of reference microlenses 3. Specifically, the microlens array shape as shown in FIG. 1 is formed by combining the phase modulation shape 4 as shown in FIG. 6 and the shape of the plurality of reference microlenses 3 as shown in FIG. 5.

The shape of the plurality of reference microlenses 3 shown in FIG. 5 is a microlens which has the axis of symmetry. On the other hand, the phase modulation shape 4 in FIG. 6 is a three-dimensional curve that varies continuously, which does not have the axis of symmetry. Therefore, on the cross-section perpendicular to the principal surface S1 of the microlens array which combines the plurality of reference microlenses 3 and the phase modulation shape 4 as shown in FIG. 1, each of the cross-sectional shapes of the plurality of microlenses 2 is an asymmetric shape that does not have the axis of symmetry.

Accordingly, the cross-sections of the plurality of microlenses 2 are different from one another, and each cross-section is asymmetric. Note that, however, because there is a probability that identical lenses may exist by chance, it is not excluded that identical microlenses exist among the plurality of microlenses 2. It is also not excluded that identical lenses are placed intentionally. No significant problem is caused by the presence of several identical microlenses. However, if the number of identical lenses exceeds 10% of the number of microlenses 2 in the microlens array, for example, it affects the properties such as luminance irregularity, which is not desirable.

The optical properties of the diffuser plate 1 using the microlens array composed of the plurality of microlenses 2 with asymmetric cross-sections can be obtained by wave optics calculation based on the scalar theory. Because there are an enormous number of combinations for design of the most appropriate phase modulation shape 4 and the microlens array, it is preferred to search for the most appropriate combination by using a computer.
(Phase Difference of Plurality of Microlenses)

A transmissive diffuser plate using a microlens array is specifically described. As shown in FIG. 6, the phase modulation shape 4 is characterized in that its shape varies continuously. A difference in height of the phase modulation shape 4 from the principal surface S1 is a phase difference that is added to each of the plurality of microlenses 2.

In the diffuser plate 1 according to this embodiment, luminance irregularity and color irregularity that occur due to diffraction are improved by adding a phase difference to each of the microlenses 2. The case where the diffuser plate 1 is a transmissive diffuser plate, and the plurality of microlenses 2 are convex lenses is considered hereinbelow. A phase difference of the plurality of microlenses 2 is a combination of the phase modulation shape 4 and the shape of the reference microlens 3, and the maximum difference in height of the apex of the plurality of microlenses 2 is $\Delta H[\mu m]$. A phase difference corresponding to the maximum difference in height $\Delta H$ is represented as $1000 \times \Delta H \times (n-1)/\lambda$ where n is the refractive index of a material that forms the microlens array and $\lambda$ is a wavelength [nm] of a light source used.

In order to achieve the improvement of luminance irregularity and color irregularity, the phase difference of the plurality of microlenses 2 needs to be set to 0.2 or more, and more preferably, it is set to 0.5 or more. In the case where a light source has a plurality of wavelength, a phase difference can be calculated for the longest wavelength among the wavelengths used.

Specifically, when a difference between the maximum height and the minimum height (maximum difference in height) of the apex of the convex part of the plurality of microlenses 2 from the principal surface S1 is $\Delta H[\mu m]$, the refractive index of the microlens 2 is n, and the wavelength of incidence light is $\lambda[nm]$, it is preferred to satisfy $$0.2 \leq \Delta H \times (n-1) \times 1000/\lambda$$

and, more preferably, $$0.5 \leq \Delta H \times (n-1) \times 1000/\lambda.$$

Although transmissive convex lenses are used as an example above, the case where the diffuser plate 1 is a transmissive diffuser plate, and the plurality of microlenses 2 are concave lenses is considered hereinbelow. In the case of transmissive concave lenses, $\Delta H$ is replaced by a difference $\Delta D[\mu m]$ between the maximum depth and the minimum depth of the concave surface of the plurality of microlenses 2 from the principal surface S1.

Specifically, when a difference between the maximum depth and the minimum depth of the apex of the concave surface of the plurality of microlenses 2 from the principal surface S1 is $\Delta D[\mu m]$, the refractive index of the microlens 2 is n, and the wavelength of incidence light is $\lambda[nm]$, it is preferred to satisfy $$0.2 \leq \Delta H \times (n-1) \times 1000/\lambda$$

and, more preferably, $$0.5 \leq \Delta H \times (n-1) \times 1000/\lambda.$$

The case where the diffuser plate 1 is a reflective diffuser plate, and the plurality of microlenses 2 are convex lenses is considered below. Note that, in the case of a reflective diffuser plate, the diffusion pattern formed on the surface does not transmit light and it is thus not a lens in a strict sense; however, the lens-like concave-convex shape is also referred to as "microlens" in this specification.

Incidence light is reflected by the surface of the microlens array with the distribution of the height of the apex of the convex part of the plurality of microlenses 2, and thereby an optical path difference is generated between forward and return paths, and a phase difference is generated between the plurality of microlenses 2. A phase difference corresponding to a difference $\Delta H$ between the maximum height and the minimum height of the apex of the convex part of the plurality of microlenses 2 from the principal surface S1 at this time is represented as $1000 \times 2\Delta H/\lambda$.

In order to achieve the improvement of luminance irregularity and color irregularity, the phase difference needs to be set to 0.2 or more, and more preferably, it is set to 0.5 or more, just like the case of a transmissive type.

Specifically, when a difference between the maximum height and the minimum height of the apex of the convex surface of the plurality of microlenses 2 from the principal surface S1 is $\Delta H[\mu m]$, and the wavelength of incidence light is $\lambda[nm]$, it is preferred to satisfy $$0.1 \leq \Delta H \times 1000/\lambda.$$

and, more preferably, $$0.25 \leq \Delta H \times 1000/\lambda.$$

The case where the diffuser plate 1 is a reflective diffuser plate, and the plurality of microlenses 2 are concave lenses is considered below. In the case of using concave lenses in a reflective type. $\Delta H$ is replaced by a difference $\Delta D$ between the maximum depth and the minimum depth of the concave part of the plurality of microlenses 2 from the principal surface S1, which is the same as the case of using concave lenses in a transmissive type.

When a difference between the maximum depth and the minimum depth of the apex of the concave surface of the plurality of microlenses 2 from the principal surface S1 is $\Delta D[\mu m]$, and the wavelength of incidence light is $\lambda[nm]$, it is preferred to satisfy $$0.1 \leq \Delta D \times 1000/\lambda$$

and, more preferably, $$0.25 \leq \Delta D \times 1000/\lambda.$$

The maximum difference in height $\Delta H$ in the microlens array may be set for the whole pattern area of the microlens array, or the maximum difference in height $\Delta H$ may be set in a certain unit area, and it may be repeated periodically or randomly.

For producing a microlens array from design data, many processing method such as machining, photolithography using a mask, maskless photolithography, etching, laser ablation and the like can be used. By producing a mold with use of such a technique and molding a resin with use of the mold, the diffuser plate 1 having the microlens array is produced. The mold can be directly used as a reflective diffuser plate. A molding method of the diffuser plate 1 may be appropriately selected from many molding methods including roll-to-roll molding, thermal press molding, molding using ultraviolet curable resin, and injection molding. In the case of using it as a reflective diffuser plate, a reflective coating such as Al may be formed on the lens surface having the curvature of the microlens array.

(Mold Production Process Step and Molding Process Step)

Figure 7:
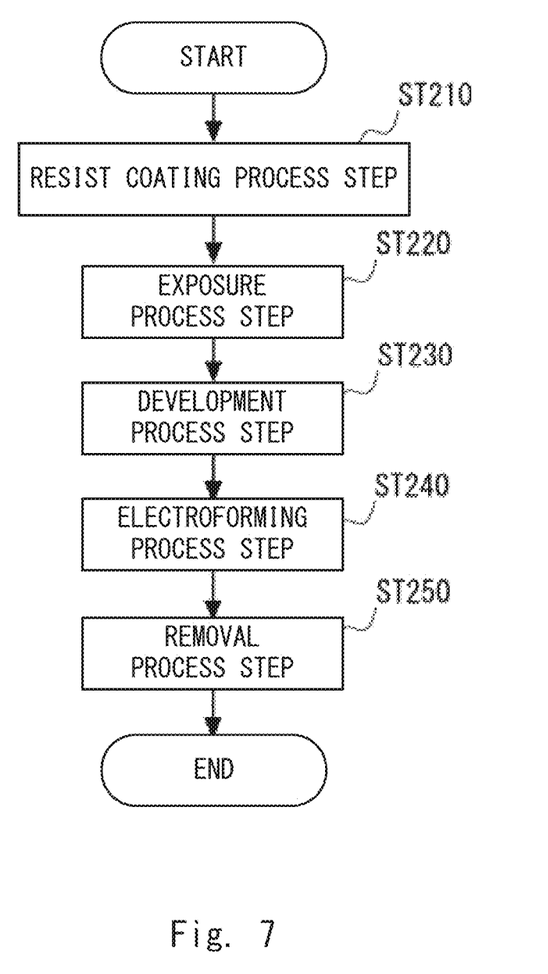
FIG. 7 is a flowchart showing a mold production process of the diffuser plate according to the first embodiment.

Hereinafter, a mold production process step (ST200) that produces a mold by laser-scanning maskless lithography and electroforming, and a resin molding process step (ST300) that produces the diffuser plate 1 by molding using the produced mold and ultraviolet curable resin are described in more detail with reference to FIGS. 3 and 7.

The maskless lithography consists of a resist coating process step (ST210) that applies photoresist onto a substrate, an exposure process step (ST220) that exposes a fine pattern onto the photoresist, and a development process step (ST230) that develops the photoresist after exposure and obtains a master having the fine pattern.

First, in the resist coating process step (ST210), positive photoresist is applied on top of a substrate. The applied photoresist film may have any thickness as long as it is equal to or more than the height of the fine pattern to be formed. It is preferred to perform baking of the applied film at a temperature of 70° to 110° C.

Next, in the exposure process step (ST220), a laser beam scans and is applied to the photoresist coated in the coating process step, thereby exposing the photoresist. The wavelength of the laser beam can be selected according to the type of photoresist, and it may be selected from 351 nm, 364 nm, 458 nm, 488 nm (the oscillation wavelength of an Ar+ laser), 351 nm, 406 nm, 413 nm (the oscillation wavelength of a Kr+ laser), 352 nm, 442 nm (the oscillation wavelength of a He-Cd laser), 355 nm, 473 nm (the pulse oscillation wavelength of a semiconductor-pumped solid-state laser), 375 nm, 405 nm, 445 nm, 488 nm (semiconductor laser) and the like, for example.

In the exposure process step (ST220) of the microlens 2, a laser beam scans the resist, modulating the laser power to a value determined by the shape of the microlens 2 and the resist sensitivity. Laser light is concentrated through an objective lens and brought to a focus on the resist. A laser spot on the resist has Gaussian distribution with a finite diameter in general. Therefore, the distribution of the quantity of light exposed to the resist is not step-like even when the laser power is changed in steps, and the light exposure distribution has a certain slope. By using such a property of laser exposure, a smooth slope shape can be formed.

A phase difference between one microlens 2 and the adjacent microlens 2 (which corresponds to a difference in lens height from the principal surface S1) becomes larger by increasing a difference in laser power applied to the microlenses 2 adjacent to each other in the exposure process step. However, if a difference in laser power is too large, a region in which the lens shape near the boundary of the adjacent microlenses 2 is deviated from a designed value becomes larger. Therefore, in order to obtain the diffusion angle distribution which is the same as that of the optical design result, it is desirable to set a difference in height between the adjacent microlenses 2 within a specified range.

In this embodiment, the maximum difference in height ΔH of the microlens array is a combination of the maximum difference in height of the phase modulation shape 4 and a difference in height caused by a difference in shape between the plurality of reference microlenses 3. When the above-described phase difference normalized by wavelength is set to 1, the average of phase differences of the plurality of microlenses 2 is 0.5. Thus, the plurality of microlenses 2 on the diffuser plate 1 has a phase difference of ½ wavelength on average, which is desirable because diffracted light is suppressed.

Then, in the development process step (ST230), the photoresist after exposure is developed. The development of the photoresist may be performed by various known methods. There is no particular limit to a developer to be used, and an alkaline developer such as tetramethylammonium hydroxide (TMAH), for example, may be used. Further, in the development process step (ST230), the photoresist is removed depending on light exposure, and the fine pattern shape of the photoresist is formed. For example, in the exposure process step (ST220), using positive resist, by the laser power corresponding to the shape of concave lenses, a master of the microlens 2 where the concave lens shape is formed in the photoresist is obtained.

Then, in the electroforming process step (ST240), a metal film is formed, by vapor deposition of nickel metal or the like, on the surface of the photoresist having the fine pattern formed by the exposure and development process steps by maskless photolithography, and thereby a mold is produced.

In the electroforming process step (ST240), conducting is performed first on the surface of the photoresist having the fine pattern by vapor deposition of nickel metal or the like. Next, by electroforming, nickel is deposited into plate form with a desired thickness on the surface of the vapor-deposited nickel film.

After that, in the removal process step (ST250), the nickel plate formed in the electroforming process step (ST240) is separated from the photoresist master, and thereby a mold (stamper) with the convex lens shape to which the concave lens shape on the photoresist is inversely transferred is obtained. In the case where the concave lens shape is required, the electroforming process step is performed again.

Then, in the resin molding process step (ST300), resin is molded by using the stamper produced in the mold production process step (ST200).

To be specific, an appropriate amount of photocurable resin, for example, is first applied on top of the surface of the stamper. Next, a base material is placed on the photocurable resin. Specifically, the base material is placed on top of the photocurable resin by pressing the base material against the photocurable resin with a hand roller and removing excess photocurable resin. Then, ultraviolet light is applied from the base material side to cure the photocurable resin. Note that a material that can transmit light such as ultraviolet light is used for the base material. After that, the base material is separated from the stamper. On the base material separated from the stamper, a photocurable resin layer is formed. On the photocurable resin layer, the stamper structure is inversely transferred.

In the case of using the microlens array as a reflective diffuser plate 1, an aluminum reflective coating may be vacuum-deposited on the surface of a member where the microlens array is formed, for example, so that incidence light is reflected on the aluminum surface. Further, in the case of a member where the microlens array is formed only on one surface of a substrate, light may be incident to the flat surface side of the substrate and reflected on the microlens array surface where the aluminum reflective coating is formed.

On the other hand, a structure in which light is incident to the microlens array surface where the reflective coating is not formed and reflected on the flat surface side where the reflective coating is formed can be also used as the diffuser plate 1. Further, a substrate where microlens arrays are formed on both sides may have a structure in which the thickness of a reflective coating on the incidence side is adjusted to function as a half mirror and the underside surface has a reflectivity of substantially 100%, so that it serves as the diffuser plate with two microlens arrays on both of the front and back surfaces. A protective coating may be further formed to protect the aluminum reflective coating where needed.

In the diffuser plate 1 according to the present invention, a phase difference is added to each of the plurality of microlenses 2, and the phase modulation shape 4 that adds the phase difference has a continuous shape, and thereby the plurality of microlenses 2 do not have the axis of rotation symmetry like a typical lens or the axis of symmetry like a toroidal lens on the cross-section perpendicular to the principal surface S1, and it has an asymmetric cross-section.

In the microlens array that is composed of the plurality of microlenses 2 with the asymmetric cross-section, the adjacent microlenses 2 are smoothly connected. By reducing scattered light in a connection between the adjacent microlenses 2, it is possible to improve the quality of appearance of the diffuser plate 1. Further, because a phase difference is added to each of the plurality of microlenses 2, luminance irregularity and color irregularity due to diffraction and interference can be reduced when the pitch of the microlenses 2 is as narrow as several hundred μm or less. It is thereby possible to provide the diffuser plate that achieves the optical properties with less luminance irregularity and color irregularity and the good quality of appearance.

Example

The present invention is described in further detail based on examples of the diffuser plate 1 according to this embodiment.

In the diffuser plate 1 according to this example, the phase modulation shape 4 and the plurality of reference microlenses 3 were designed separately from each other in the microlens array composed of the plurality of microlenses 2 on the principal surface S1 as described above.

The phase modulation shape 4 was set for the whole microlens array. In the phase modulation shape 4, the maximum difference in height from the principal surface S1 for adding a phase difference was ΔH=1.5 μm. On the principal surface S1, a raised height (raised part) for adding a phase difference was set by generating uniform random numbers corresponding to the respective positions of the plurality of microlenses 2. However, merely setting different raised heights for the plurality of microlenses 2 results in discontinuity of a phase difference between the adjacent microlenses 2. Therefore, the continuous phase modulation shape 4 was formed by moving-average processing of the raised height set for each of the plurality of microlenses 2. FIG. 6 shows a part of the designed phase modulation shape 4.

The shape of the reference microlens 3 is described next. The lens shape of the reference microlens 3 may be a typical rotationally symmetric shape and, in this case, the cross-section of the reference microlens 3 is represented by the following expression (1) where C is a curvature [1/μm], K is a conic constant, r is a distance from the central axis, and z is a sag with respect to the point of intersection between the central axis and the lens surface. The curvature C is represented as C=1/R, using a curvature radius R.

$$z = \frac{-Cr}{1 + \sqrt{1 - (K+1)C^2 r^2}} \quad (1)$$

The cross-sectional shape of the reference microlens 3 used in the diffuser plate 1 of this example is represented by the following expression (2). In this case, the reference microlens 3 is a toroidal lens having a rectangular undersurface, and the curvature is defined in each of the x-direction and the y-direction. With the central axis of the lens as the point of origin, $r_x$ is a distance from the central axis in the x-direction, $r_y$ is a distance from the central axis in the y-direction, $C_x$ is a curvature [1/μm] in the x-direction (x-z plane), and $C_y$ is a curvature [1/μm] in the y-direction, $K_x$ of (x-z plane) is a conic constant in the x-direction (x-z plane), $K_y$ is a conic constant in the y-direction (y-z plane).

$$z = \frac{-C_x r_x}{1 + \sqrt{1 - (K_x+1)C_x^2 r_x^2}} + \frac{-C_y r_y}{1 + \sqrt{1 - (K_y+1)C_y^2 r_y^2}} \quad (2)$$

In the diffuser plate 1 of this example, the pitch of the plurality of microlenses 2 was fixed to Px=30 μm and Py=32 μm. The plurality of reference microlenses 3 had four types of curvature radii in the x-direction and three types of curvature radii in the y-direction. In the diffuser plate 1 of this example, total twelve types of reference microlenses 3 that combine the curvature radii in the x-direction and the y-direction were randomly selected using uniform random numbers and placed on the principal surface S1. The reference microlens 3 was designed to be a spherical lens ($K_x$=0) with the curvature radius $R_x$[μm] of 52.9, 58.5, 69.8, 77.4 in the x-direction and an aspherical lens ($K_y$=−0.45) with the curvature radius $R_y$[μm] of 28.2, 31.2, 34.6 in the y-direction. Further, the height of the lowest part was a reference height in all of the reference microlenses 3.

The shape of the plurality of microlenses 2 in the microlens array is a composite shape of the phase modulation shape 4 and the shapes of the plurality of reference microlenses 3. FIG. 2 shows an example of the shape of the plurality of microlenses 2 when it is designed in the area of about 450 μm×480 μm. The shape of the plurality of microlenses 2 that constitute the microlens array is a shape that overlaps the plurality of reference microlenses 3 having the axis of symmetry and the phase modulation shape 4 not having the axis of symmetry or the point of symmetry. Therefore, each of the plurality of microlenses 2 that constitute the microlens array has an asymmetric cross-section.

Figure 8:
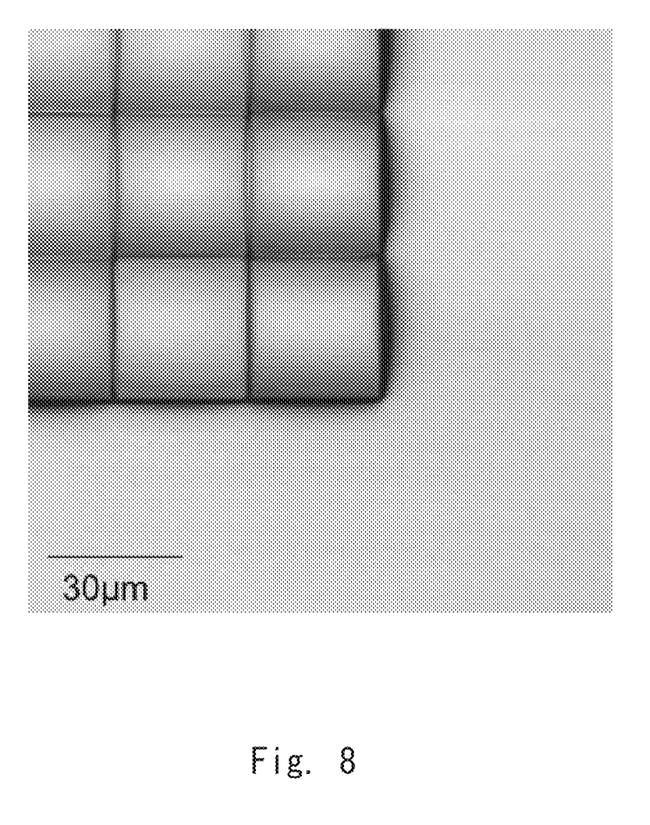
FIG. 8 is a view showing an image, observed by a laser microscope, of a stamper used for production of the diffuser plate according to an example 1.

The whole microlens array area of about 60 mm×80 mm on the surface of the diffuser plate 1 was designed based on the above facts (ST100). Using this design data, a stamper in which a microlens array shape having a plurality of convex lenses was formed was obtained after the above-described mold production process step (ST200). FIG. 8 shows an observed image of the lens shape of this stamper by a confocal laser microscope. As shown in FIG. 8, a plurality of convex lens shapes with phase differences were formed.

Then, molding using photocurable resin was performed using the stamper shown in FIG. 8. A polycarbonate film with a thickness of 0.3 mm was used as a base material, and acrylic photocurable resin with a refractive index of 1.52 was poured between the stamper and the base material and molded, thereby producing the diffuser plate 1.

Figure 9A:
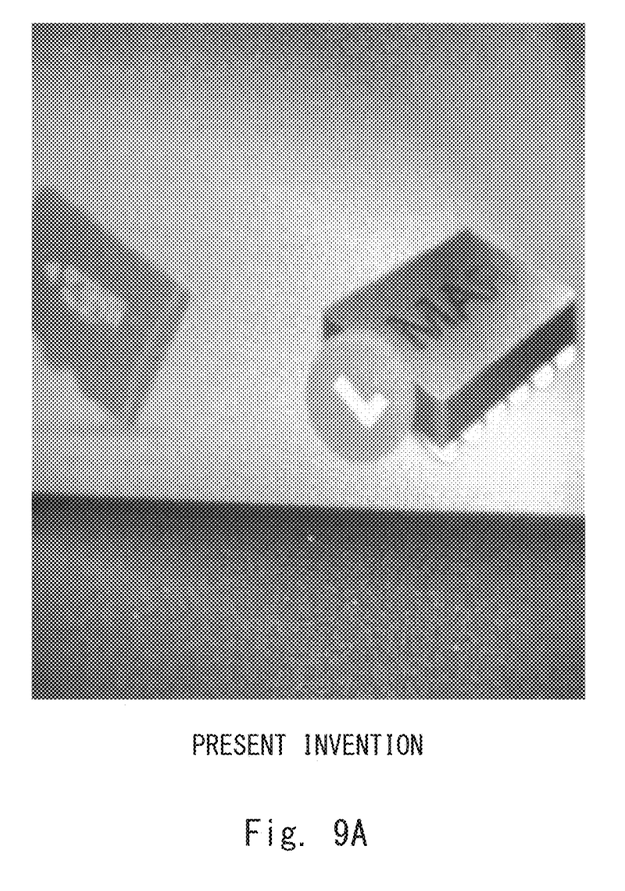
FIG. 9A is a view showing an observation result of a transmission image of a projector of the diffuser plate according to the example 1.
Figure 9B:
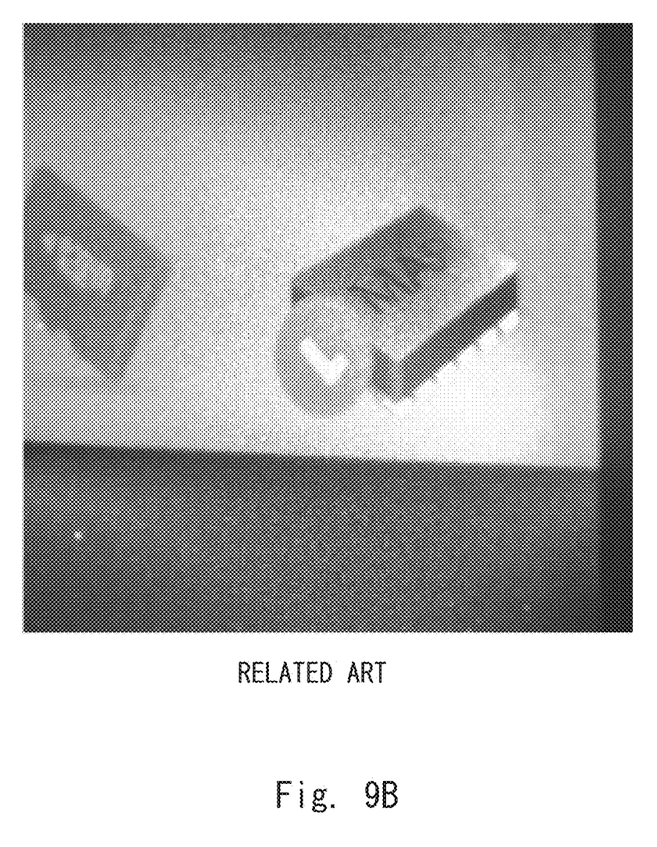
FIG. 9B is a view showing an observation result of a transmission image of a projector of the diffuser plate according to related art.

FIGS. 9A and 9B show results of projecting an image, by a projector (PK301 manufactured by Optoma), on the diffuser plate 1 of this example obtained by molding and taking the transmission image of the diffuser plate 1 by a digital camera. The distance between the diffuser plate 1 and the projector was 10 cm, so that the focal point of the projector was at the position of the diffuser plate 1. The image was taken by the digital camera by focusing on the diffuser plate 1 from the direction horizontally shifted by 40° from the front.

FIG. 9A is a result of projecting an image on the diffuser plate 1 according to this example, and FIG. 9B is a result of projecting an image on the diffuser plate 1 according to related art, composed of a microlens array where the phase modulation shape 4 was a simple raised shape for each reference microlenses 3. Comparison shows that the graininess of the image was significant in the one according to related art (FIG. 9B), and the graininess was reduced and the quality of appearance was improved in the diffuser plate 1 according to this example (FIG. 9A).

Figure 10:
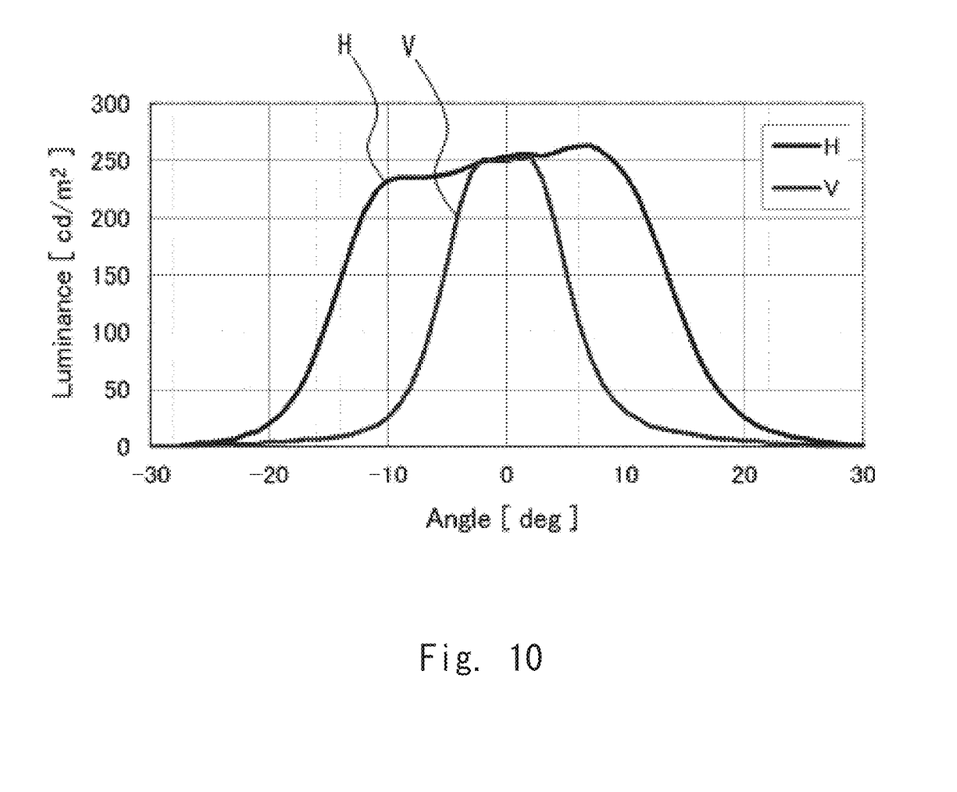
FIG. 10 is a view showing diffusion angle distribution characteristics of the diffuser plate according to the first embodiment.

FIG. 10 is a result of measuring the diffusion angle distribution of transmitted light intensity of the diffuser plate 1 by using a luminance meter (BM-7 manufactured by Topcon Corporation) and a goniometer stage. In FIG. 10, H indicates the diffusion angle distribution in the horizontal direction and V indicates the diffusion angle distribution in the vertical direction. Collimated light of a white LED was used as a light source, and light was vertically incident on the diffuser plate 1. Luminance irregularity was small in the diffuser plate 1 according to this example, and Luminance irregularity was reduced to the level better than that of the related art, and the quality of appearance of the projected image was also improved. Further, the diffusion properties of the diffuser plate 1 were properties close to top-hat and centering on the front (0°), and the optical axes of incident light and outgoing light substantially coincide.

It should be noted that the present invention is not limited to the above-described exemplary embodiment and may be varied in many ways within the scope of the present invention. For example, the microlenses 2 placed on the diffuser plate 1 are not limited to transmissive lenses. On the principal surface S1 of the reflective diffuser plate 1, a light diffusion pattern having the same concave-convex shape as the microlenses 2 may be formed in a lattice pattern just like in the microlens 2.

This application is based upon and claims the benefit of priority from Japanese patent application No. 2014-201606, filed on Sep. 30, 2014, the disclosure of which is incorporated herein in its entirety by reference.

REFERENCE SIGNS LIST

1 DIFFUSER PLATE
2 MICROLENS
3 REFERENCE MICROLENS
4 PHASE MODULATION SHAPE

The invention claimed is:

1. A diffuser plate where a plurality of microlenses are placed on a principal surface, wherein shapes of the plurality of microlenses along a cross-section perpendicular to the principal surface are different from one another and do not have an axis of symmetry, wherein
the diffuser plate is a reflective diffuser plate,
the plurality of microlenses are convex lenses, and
$0.1 \leq \Delta H \times 1000/\lambda$ is satisfied where $\Delta H[\mu m]$ is a difference between a maximum height and a minimum height of an apex of a convex surface of the plurality of microlenses from the principal surface, and $\lambda[nm]$ is a wavelength of incidence light.

2. A diffuser plate where a plurality of microlenses are placed on a principal surface, wherein shapes of the plurality of microlenses along a cross-section perpendicular to the principal surface are different from one another and do not have an axis of symmetry, wherein
the diffuser plate is a reflective diffuser plate,
the plurality of microlenses are concave lenses, and
$0.1 \leq \Delta D \times 1000/\lambda$ is satisfied where $\Delta D[\mu m]$ is a difference between a maximum depth and a minimum depth of an apex of a concave surface of the plurality of microlenses from the principal surface, and $\lambda[nm]$ is a wavelength of incidence light.

3. The diffuser plate according to claim 2, wherein a surface shape of each of the plurality of microlenses along the cross-section consists only of curves.

4. The diffuser plate according to claim 2, wherein apexes of the plurality of microlenses are at different positions in a direction perpendicular to the principal surface.

5. The diffuser plate according to claim 2, wherein the plurality of microlenses are arranged in a lattice pattern on the principal surface.

6. The diffuser plate according to claim 2, wherein a shape of the plurality of microlenses is a composite shape of one reference microlens repetitively placed on the principal surface and a phase modulation shape having a curve continuously varying with respect to the principal surface.

7. The diffuser plate according to claim 2, wherein an optical axis of a microlens array composed of the plurality of microlenses is in a direction perpendicular to the principal surface.

8. The diffuser plate according to claim 1, wherein a shape of the plurality of microlenses is a composite shape of one reference microlens repetitively placed on the principal surface and a phase modulation shape having a curve continuously varying with respect to the principal surface.

9. The diffuser plate according to claim 1, wherein an optical axis of a microlens array composed of the plurality of microlenses is in a direction perpendicular to the principal surface.

10. A method for designing a diffuser plate according to claim 1 where a plurality of microlenses are placed on a principal surface, the method comprising:
determining one or a plurality of shapes of reference microlenses where a cross-section perpendicular to the principal surface has an axis of symmetry;
placing the plurality of reference microlenses on the principal surface;
forming a phase modulation shape having a curve continuously varying with respect to the principal surface; and
determining a shape of the plurality of microlenses by combining a shape of the plurality of placed reference microlenses and the phase modulation shape.

11. The method according to claim 10, wherein
a plurality of raised parts to be disposed between the plurality of placed reference microlenses and the principal surface are formed, and
the phase modulation shape is formed by averaging heights of the plurality of formed raised parts.

12. The method according to claim 11, wherein the phase modulation shape along the cross-section is a moving-average approximate curve of heights of the plurality of formed raised parts.

13. The method according to claim 10, wherein the plurality of microlenses are arranged in a lattice pattern on the principal surface.

14. The diffuser plate according to claim 1, wherein a surface shape of each of the plurality of microlenses along the cross-section consists only of curves.

15. The diffuser plate according to claim 1, wherein apexes of the plurality of microlenses are at different positions in a direction perpendicular to the principal surface.

16. The diffuser plate according to claim 1, wherein the plurality of microlenses are arranged in a lattice pattern on the principal surface.

* * * * *